United States Patent [19]

Misaki et al.

[11] 4,306,255
[45] Dec. 15, 1981

[54] MAGNETIC RECORD/PLAYBACK SYSTEM OF ROTATING HEAD TYPE

[75] Inventors: Takashi Misaki, Hirakata; Yukihiko Miyawaki, Kadoma, both of Japan

[73] Assignee: Matsushita Electric Industrial Co., Ltd., Osaka, Japan

[21] Appl. No.: 49,116

[22] Filed: Jun. 18, 1979

[30] Foreign Application Priority Data

Jun. 22, 1978 [JP] Japan ................................ 53/76045
Jun. 27, 1978 [JP] Japan ............................ 53-88903[U]

[51] Int. Cl.³ ...................... H04N 5/795; H04N 5/78; G11B 15/46; G11B 21/10
[52] U.S. Cl. ...................................... 360/10; 360/38; 360/73; 360/77
[58] Field of Search ...................... 360/10, 38, 70, 73, 360/77

[56] References Cited

U.S. PATENT DOCUMENTS

| 3,557,320 | 1/1971 | Hopf | 360/10 |
| 3,585,291 | 6/1971 | Yamakawa | 360/77 X |
| 3,943,562 | 3/1976 | Opelt | 360/10 |
| 4,017,895 | 4/1977 | Oprandi et al. | 360/38 |
| 4,127,881 | 11/1978 | Wakami et al. | 360/73 X |
| 4,143,405 | 3/1979 | Kubota | 360/70 X |
| 4,190,869 | 2/1980 | Ota | 360/10 |

FOREIGN PATENT DOCUMENTS 52-15218 2/1977 Japan .................................. 360/10
2009998 6/1979 United Kingdom ................. 360/10

OTHER PUBLICATIONS

Video Tape Recorders; Kybett; copyright 1974 by Howard Sams & Co., Inc., Indianapolis, pp. 144 and 146.

Primary Examiner—Aristotelis M. Psitos
Attorney, Agent, or Firm—Stevens, Davis, Miller & Mosher

[57] ABSTRACT

A magnetic record/playback system of a rotating head type comprising switching device for switching the drive mode of a capstan motor to a low speed drive mode when the operation mode of the magnetic record/playback system is switched from a normal play mode to a still picture mode, level detecting device for producing a pulse in accordance with a period where a level of the envelope of a signal reproduced from the rotating head is below a predetermined level, signal supply for producing a logical product signal of the produced pulse and a head switching pulse of the rotating head, device for stopping the capstan being driven in the low speed drive mode in response to the logical product signal, and control device for controlling the detected level so that the width of the output pulse from the level detecting device is constant.

2 Claims, 12 Drawing Figures

MAGNETIC RECORD/PLAYBACK SYSTEM OF ROTATING HEAD TYPE

The present invention relates to a magnetic re record/playback system (VTR) of a helical scan type which is capable of reproducing a high quality still picture with a simple construction.

As is known, the helical scan type VTR sequentially records a video signal in one field or one frame on a magnetic tape in the form of a single recording track slanted with respect to the longitudinal direction of the magnetic tape by means of a rotating head, and sequentially plays back or reproduces the recorded video signal from the track by the rotating head. Further, a vertical synchronizing signal is recorded at the end of the slanted single recording track in order that a switching point from one recording point to the next point, i.e., a switching point of the recording track, is positioned near the synchronizing signal.

In a playback mode of this type VTR, when a running magnetic tape is stopped and played back, a still picture is obtained. However, the scanning trace of the head on the magnetic tape at the time of the magnetic tape is different from the recording track. Therefore, the head fails to accurately trace one recording track with the result that there is produced a period where no reproduced signal is obtained. If this period is positioned near the vertical synchronizing signal, a picture with little distortion is played back.

The period with no reproduced signal shifts depending on the relative position of the trace of the head to the recording track, that is to say, a position where the magnetic tape stops. It is for this reason that, after the magnetic tape is once stopped, the position of the magnetic tape has been conventionally slightly adjusted so as to play back a high quality picture while observing the reproduced picture.

Accordingly, an object of the invention is to provide a magnetic record/playback system which automatically reproduces an optimumly adjusted picture. Further objects, features and advantages of the invention are explained below in conjunction with the following accompanying drawings.

Figure 1:
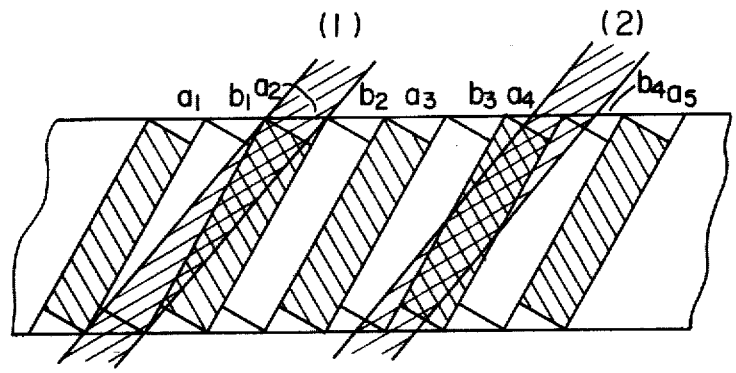
FIG. 1 illustrates a tape recording pattern and the traces of video heads in a still picture playback mode when a picture is recorded in an azimuth recording method.
Figure 2:
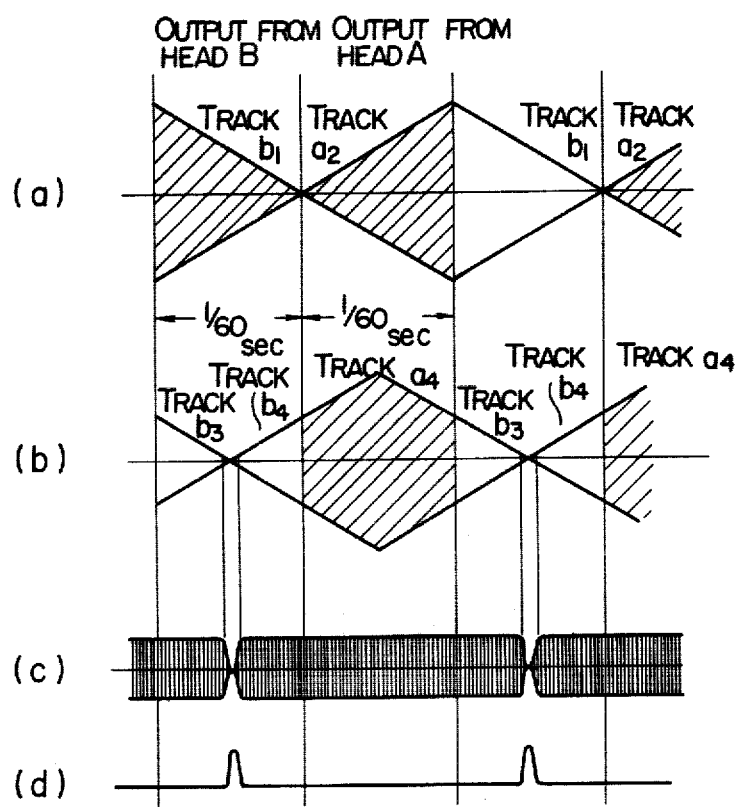
FIG. 2 shows envelopes of the signals played back from the recording tracks on the magnetic tape shown in FIG. 1 and waveforms for illustrating noise bands.

Reference is first made to FIG. 1 illustrating recording tracks by a 2-head, helical scan VTR and video head traces in a still picture playback mode. The head gap angles of the two video heads A and B are slightly different from each other, thus effecting an azimuth record. Accordingly, tracks a1, a2, a3, . . . recorded by the A head may be played back by only the A head and similarly tracks b1, b2, b3, . . . recorded by the B head may be played back only the same head. In FIG. 2 illustrating wave forms of head output signals (video signals frequency modulated) in the still picture playback mode, FIGS. 2(a) and 2(b) show envelopes of the head output signals corresponding to still picture playback tracks 1 and 2 shown in FIG. 1. In the track 1, a point where the envelope disappears corresponds to a head switching point and falls within the vertical blanking section. In the track 2, the envelope disappearing point is located within a field signal section. The zero vicinity of the envelope after the decrease of the envelope output appears as a noise band in the picture played back. FIG. 2(c) shows a waveform of the head output signal after passed by a limiter. When the signal with such a waveform is amplitude-detected, a waveform shown in FIG. 2(d) is obtained. The magnetic record/playback system according to the invention detects the waveform shown in FIG. 2(d) to know the track the head now scans for playback. In other words, the magnetic record/playback system runs the tape until a detected pulse output signal in FIG. 2(d) appearing in the section where the envelope is small, approaches to the head switching position.

Figure 3:
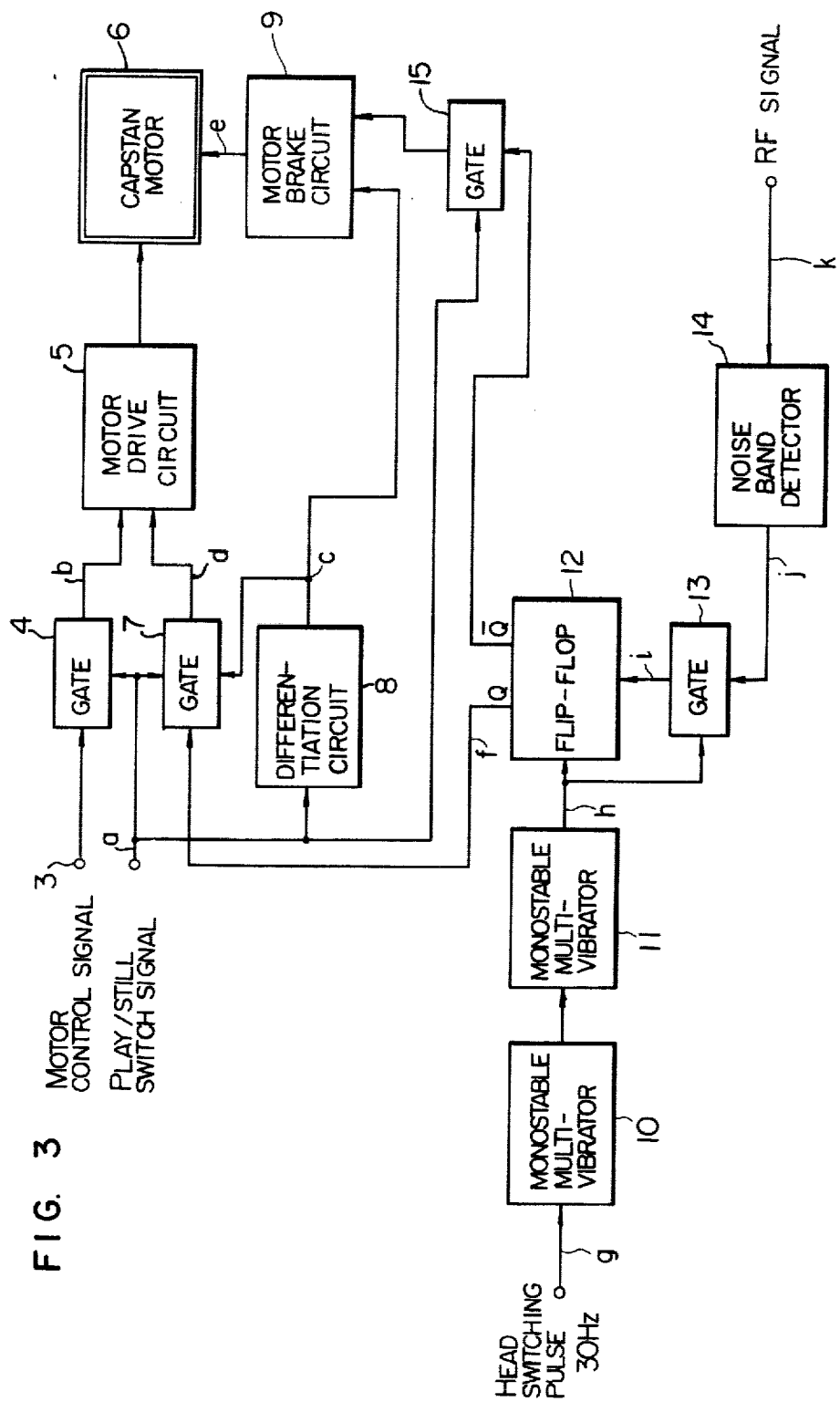
FIG. 3 shows a block diagram of a basic construction of the magnetic record/playback system according to the invention.
Figure 4:
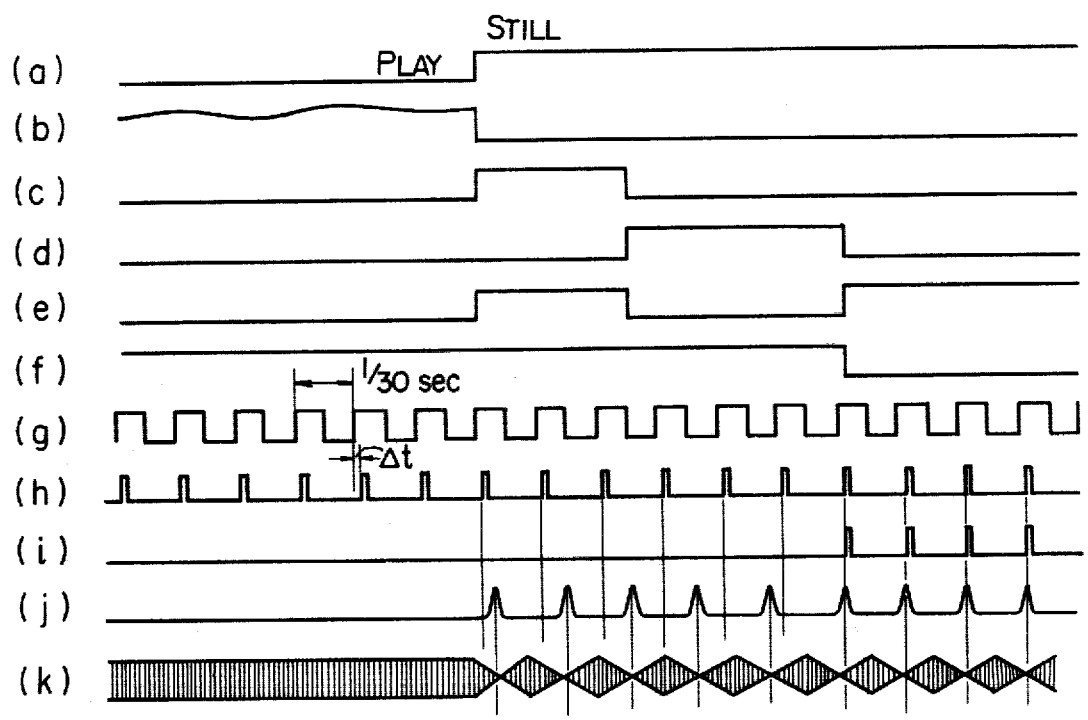
FIG. 4 shows a set of waveforms useful in explaining the operation of the magnetic record/playback system shown in FIG. 3.

FIG. 3 shows a block diagram illustrating the basic construction of the present invention and FIG. 4 shows a set of waveforms useful in explaining the operation of the basic construction.

In a normal playback mode of the VTR, a motor control signal enters an input terminal 3 and passes through a gate 4 and a motor drive circuit 5 and drives a capstan motor 6 at a constant speed. When a switching signal (PLAY/STILL) a for switching over from a normal playback to a still picture playback causes the operation of the record/playback system to be switched to a STILL mode, the gate 4 is disabled (non-conductive state) while a gate 7 is enabled (conductive state). As a result, an output signal (d) of the gate 7 drives the capstan motor 6, through the motor drive circuit 5. At an instant that the switching signal a switches the system operation mode to the STILL mode, a differentiation circuit 8 operates to produce an output signal c. Only during a high level segment of the signal c, the signal c instantaneously disables the gate 7 prior to the switching signal a while at the same time drives a motor brake circuit 9 to apply an electromagnetic brake to the capstan motor 6 and then to stop the running of the magnetic tape. Then, the output control signal (d) of the gate 7 drives the capstan 6.

A head switching pulse (of 30 Hz) g applied to a monostable multivibrator (MM) 10 switches the head A to the switch B and vice versa in accordance with the rotating phase of the rotating head. The pulse g is phase-shifted by Δt by MM 10 and is then shaped to be a narrow pulse (h) in another monostable multivibrator (MM) 11. The pulse (h) is used as a set signal of a flip-flop (FF) 12 and as a gate signal for a gate 13. An RF signal k of the head output signal serves as a pulse (j)

(corresponding to the signal (d) in FIG. 2) to detect by a noise band detecting circuit 14 a section where the envelope output signal is below a given level. The pulse (j) is used to know what track is now played back. Specifically, the pulse (j) is gated by the gate 13 in response to the gate pulse (h). In other words, only when the pulse (j) and the gate pulse (h) are in phase, the signal (i) is produced from the gate 13. The signal (i) serves as a reset signal of FF 12. When the set signal (h) is present but the reset signal (i) is absent, FF 12 produces a signal (f) of high level at the terminal Q. When the reset signal (i) is present, FF 12 produces a low level signal at the terminal Q but it produces a high level signal at the terminal $\bar{Q}$. The high level signal is supplied through a gate 15 to the motor brake circuit 9. The gate 15 is controlled for its ON-OFF operation by the switching signal a and is conductive only in the STILL mode. In other words, when the operation mode of the record/playback system is switched to the STILL mode by the switch signal a, the capstan motor 6 is instantaneously magnetic-braked to stop. Then, the capstan motor 6 is controlled by the output signal (f) derived from FF 12. The level of the signal (f) is so selected that the motor is slowly rotated. With slow rotation of the magnetic tape, the noise band detecting signal (j) approaches to the switching point of the head switching pulse and is in phase with the pulse (h). At this time, FF 12 becomes in a reset state and the signal (f) becomes zero. Further, the control signal to the capstan motor is stopped and the terminal $\bar{Q}$ of FF 12 provides a motor brake signal to instantaneously stop the tape running. Through this operation, the noise band is positioned in the vertical blanking section. In this way, when the operation mode of the record/-playback mode is switched from the normal PLAY mode to the STILL mode, the magnetic tape always stops at a position that the noise band falls within the vertical blanking section. Therefore, a still picture reproduced is free from the noise band. In the above-mentioned embodiment, the magnetic brake is used for stopping the tape running but a mechanical brake of reel system may also be used for the same purpose. In the latter case, a brake solenoid is controlled in the corresponding above-mentioned manner.

In fact, the track width of the video head preferably is slightly wider than the pitch width of a recording pattern in order to narrow the noise band width as narrow as possible.

In this embodiment, the noise band gate signal (h) has 30 Hz, that is to say, it is generated every frame. However, it may be a signal of 60 Hz corresponding to one field.

The embodiment mentioned above can automatically stop the running of the magnetic tape at a position where a good still picture may automatically be obtained. However, because of a level variation of the reproduced output signal from the magnetic head, the magnetic tape frequently fails to stop at the proper stopping position.

Figure 5:
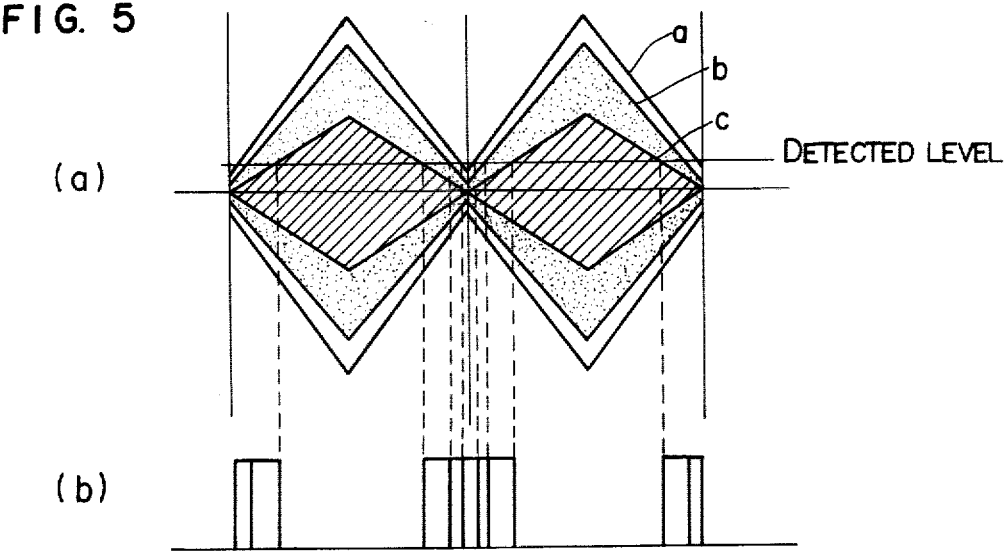
FIG. 5 shows waveforms useful in explaining the principle of the present invention.

In the playback mode of a still picture, the envelope of the RF signal takes a shape like a triangle wave, as shown in FIG. 4(k). The RF signal with such an envelope is AM-detected, the level of which is detected with respect to a predetermined level and finally the signal (j) is produced on the basis of the detected level. In this case, the pulse width of the signal (j) depends on the peak level of the signal (j). For this, the peak level must be constrained to be within a range. When the pulse width of the signal (j) is excessively wide, the signal (j) is loosely related in phase to the gate signal (h) so that it is impossible to precisely set the noise band within the blanking section. This state is well illustrated in FIG. 5. FIG. 5(a) shows the RF signal (k) with different levels a, b and c. When the level of the RF signal changes, as shown in FIG. 5(a), the pulse width of the signal (j) changes, as shown in FIG. 5(b).

When the level of the RF signal (k) lowers and the pulse width widens, the tape stopping position is determined by a position of the signal (h) within the widened pulse width. Therefore, the stoppage position of the magnetic tape fails to coincide with the bottom of the envelope so that the noise band appears on the reproduced picture. On the other hand, when the level of the signal (k) is excessively high, the pulse width of the signal (j) is excessively narrow to be ineffective in its action. The level variation of the reproduction signal (k) is caused by temperature change, interchange of magnetic tapes, playback demagnetization and the like.

The present invention is also directed to solve such a problem and its embodiment will be described with reference to FIG. 6. The reproduction RF signal (k) is amplified by an amplifier 20 and is then applied to an AM detector 21 where it is subjected to an envelope detection. The envelope detected is then applied to a level discriminator or detector 22 which in turn produces a signal (j) with a pulse width corresponding to a period of the envelope below a given level.

The operation just mentioned is the same as that of the noise band detector 14 shown in FIG. 3. The signal (j) is amplified by the amplifier 23 and then is converted into a DC signal with a level corresponding to the pulse width by an integrating circuit 24. The converted DC signal is outputted as a signal (l) from the integrating circuit 24. The signal (l) is fed back to the level discriminator 22 to control the detected level in order that the pulse width of the signal (j) is always constant.

Figure 6:
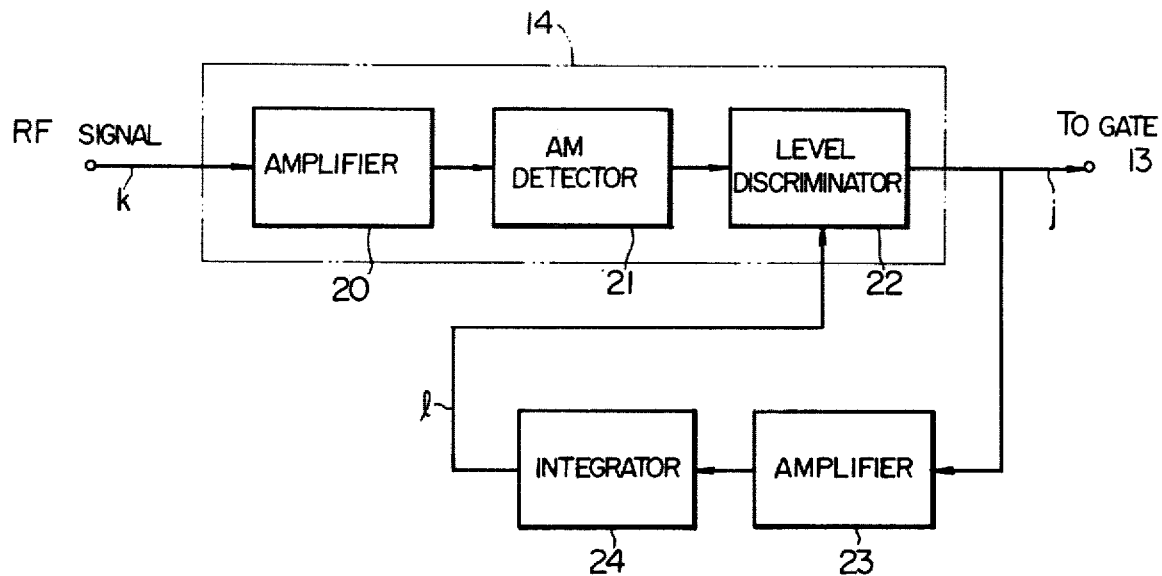
FIG. 6 shows a block diagram of an essential part of one embodiment of the present invention.
Figure 7:
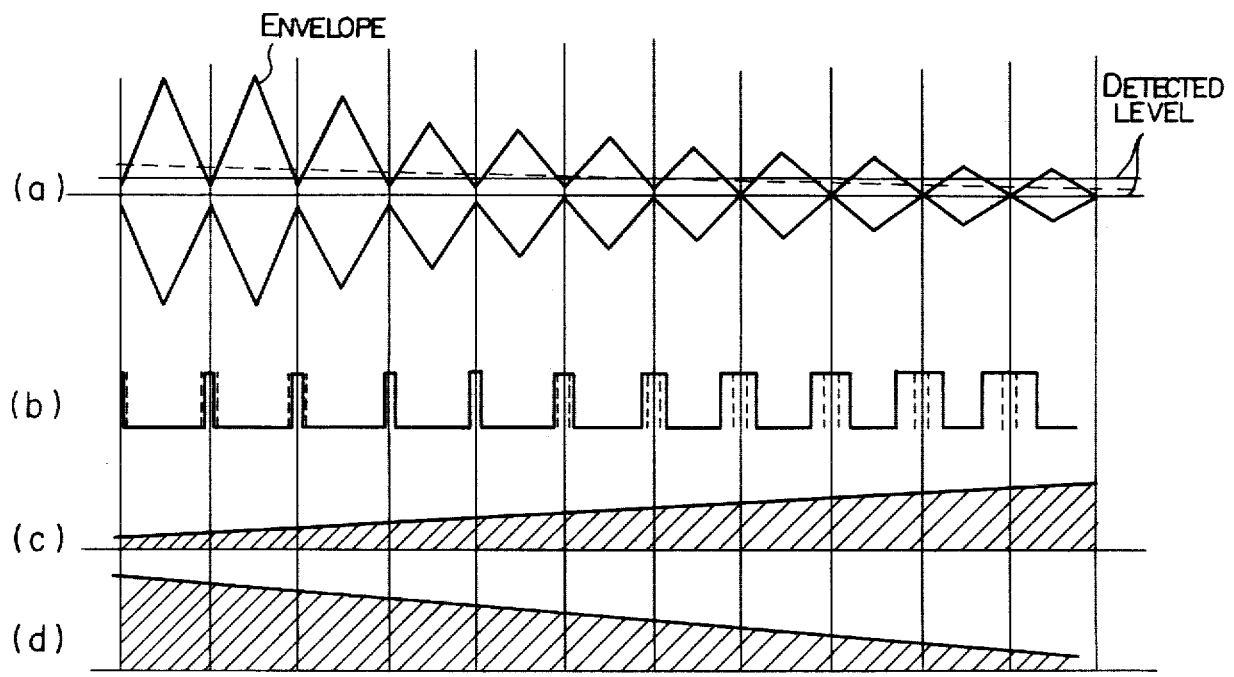
FIG. 7 shows a set of waveforms for explaining the operation of the circuit shown in FIG. 6.

FIG. 7 shows waveforms at the necessary portions of the circuit shown in FIG. 6. In FIG. 7, (a) shows a reproduction signal (k), (b) the output signal (j) from the level discriminator 22, (c) the output signal (l) of the integrating circuit 24, and (d) the detected level of the level discriminator 22. In FIGS. 7(a) and (b), waveforms indicated by continuous lines show those when no feedback is applied and waveforms by dotted lines those when a feedback is applied. As seen from those figures, the use of the feedback loop in the level discriminator 22 enables the level discriminator 22 to stably detect the noise band against a level variation of the reproduced signal.

Figure 8:
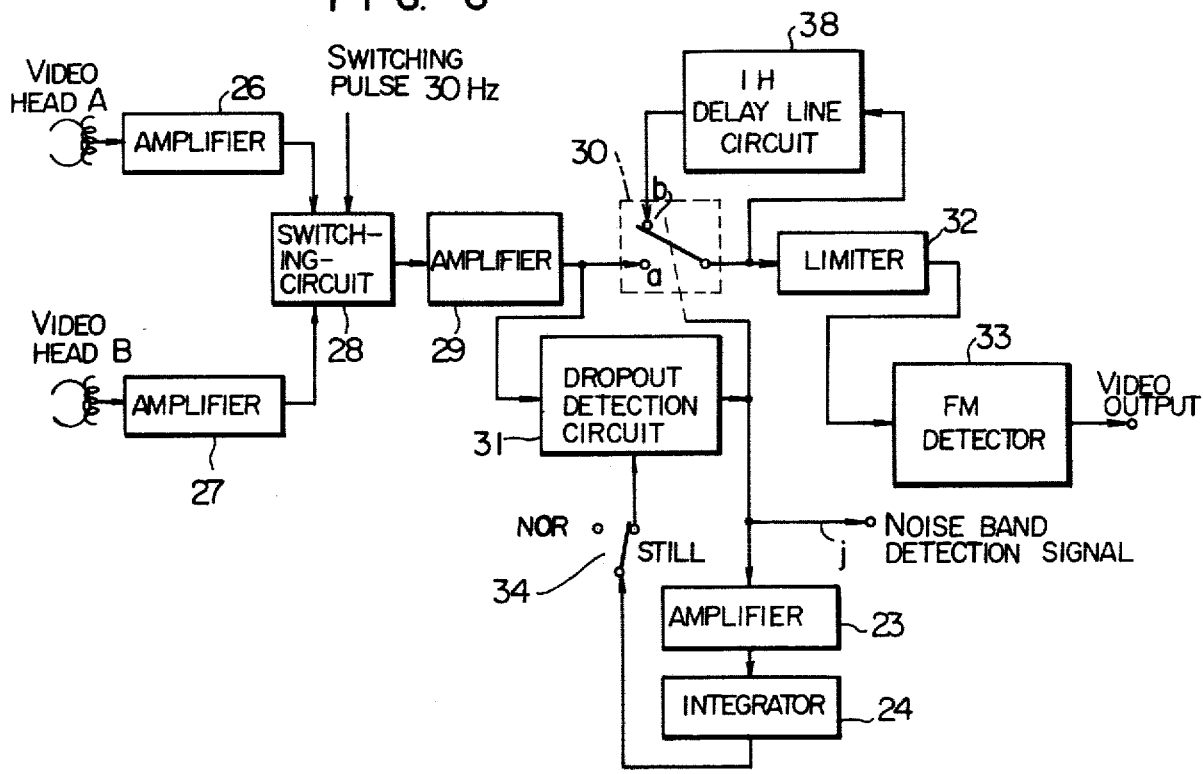
FIGS. 8 and 9 show block diagrams of another embodiments according to the invention.

FIG. 8 shows a block diagram in which the noise band detection to obtain the signal (j) is performed by a dropout detection arrangement provided in the VTR system. In FIG. 8, A and B designate video heads of which the reproduced output signals are introduced into a head switching circuit 28, through amplifiers 26 and 27. The head switching circuit 28 arranges the reproduced signals into a train of signals by a head switching pulse which are introduced through an amplifier 29 to a switching circuit 30 and a dropout detection circuit 31.

The dropout detection circuit 31, which is constructed as a dotted block 14 shown in FIG. 6, produces a given output signal during a period that the envelope of the reproduced signal is below a given detection level. The output signal from the detector 31 drives the switching circuit 30 and when the envelope falls below a given level, that is to say, only during dropout period, the movable contact of the switching circuit 30 is switched to the terminal b. Reference numeral 38 designates a delay line circuit of one horizontal scanning period, 32 a limiter circuit, and 33 an FM detector circuit. These circuits form a dropout compensating unit included in a usual VTR. Further, in the dropout detection circuit 31, a part of the output of the dropout detection circuit 31 is fedback to the dropout detection circuit 31, through an amplifier 23, an integration circuit 24, and a switch 34. This feedback circuit is made operative when the switch 34 is turned to the STILL mode side in interlocking relation with the still picture playback operation. In the still picture playback mode, the operation similar to that shown in FIG. 6 is performed to cause the dropout detection circuit 31 to produce an output signal as the noise band detection signal (j).

Figure 9:
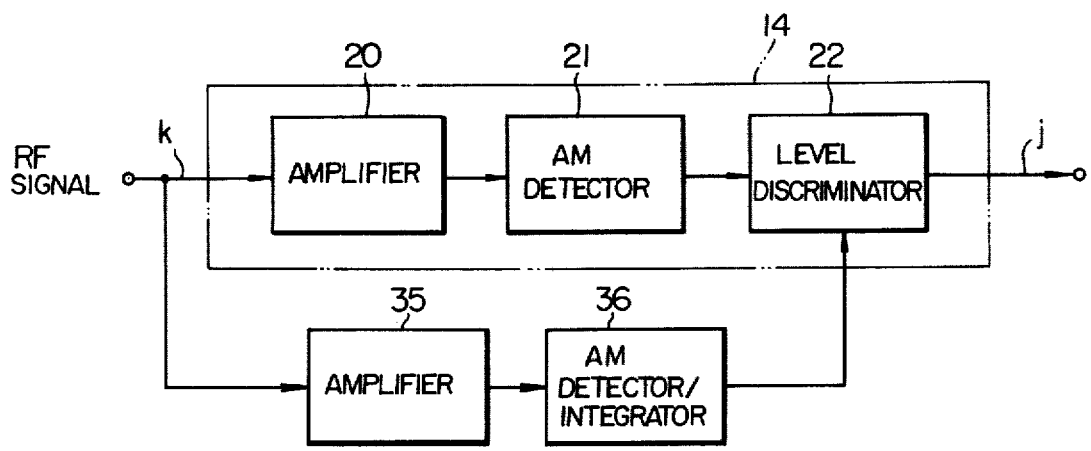

FIG. 9 shows another embodiment of the magnetic record/playback system according to the invention. This embodiment is different from the embodiment shown in FIG. 6 in that the RF signal (k) is fed back to the level discriminator 22, through an amplifier 35 and a detector/integrator circuit 36. In this case, the feedback signal is a DC signal shown in FIG. 7(d) corresponding to the envelope level of the signal (k).

As described above, when the operation mode is switched from the playback mode to the still mode, the magnetic record/playback system may automatically stop the running of the magnetic tape to a position where the best still picture is obtained.

Figure 10:
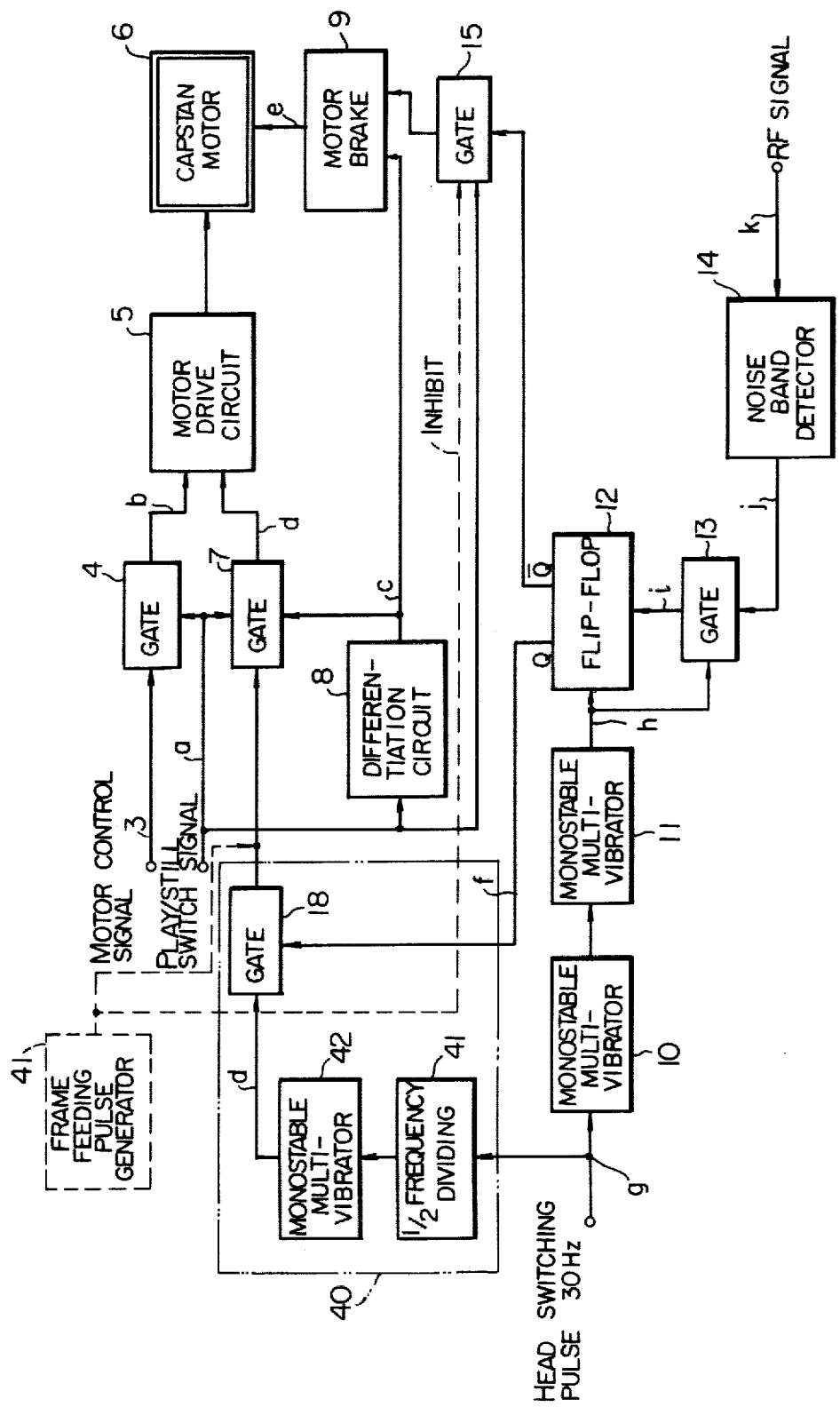
FIG. 10 shows still another embodiment of the magnetic record/playback system according to the invention.
Figure 11:
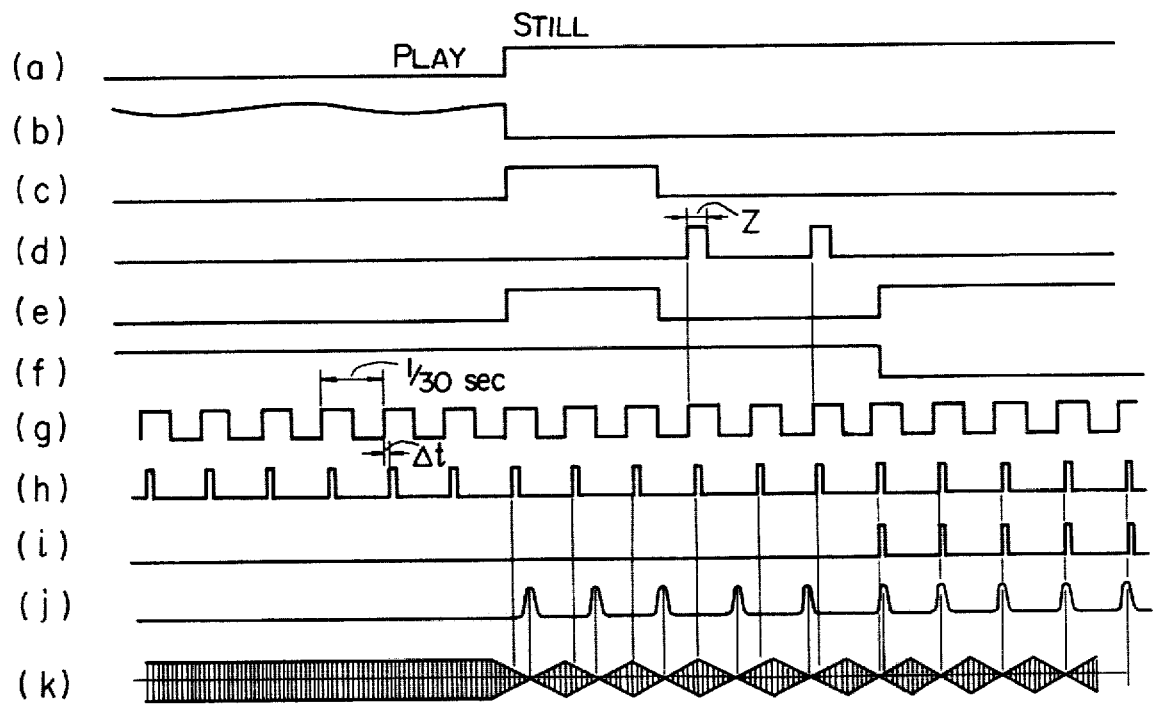
FIGS. 11 and 12 show sets of waveforms for explaining the operation of the record/playback system shown in FIG. 10.
Figure 12:
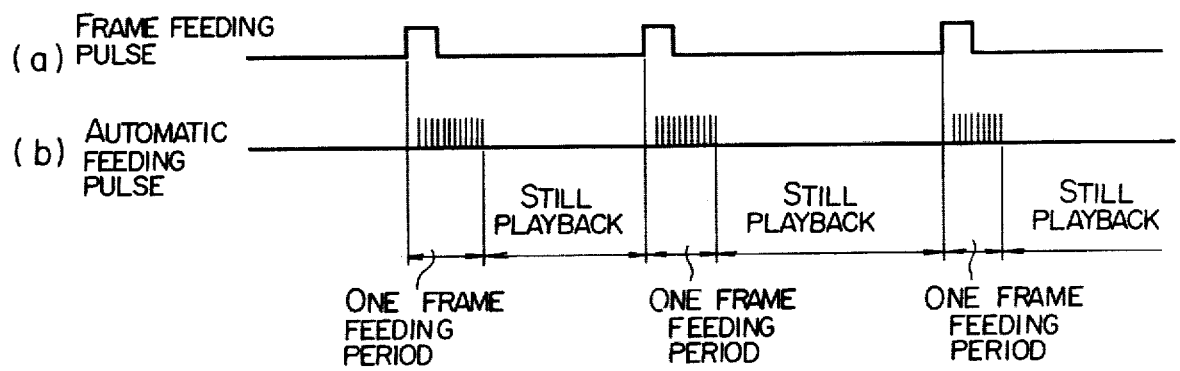

Turning now to FIG. 10, there is shown another embodiment of the record/playback system according to the invention. The waveforms at the necessary portions in the circuit of FIG. 10 are illustrated in FIGS. 11 and 12. This embodiment is improved in that the magnetic tape is more accurately stopped at a precise position when the PLAY mode is switched to the STILL mode, thereby improving the picture quality of a still picture, and that, in a still picture playback mode, the magnetic tape is transported for a short time, if necessary, to change a still picture reproduced, that is to say, to feed frames. The differences of the embodiment shown in FIG. 10 from that in FIG. 3 reside in that a block 40 enclosed by a two-dots chain line for pulse-driving the capstan motor when the PLAY mode is switched to the STILL mode and a block 41 enclosed by a dashed line for frame feeding.

The Pulse drive system for the capstan motor, which is represented by the block 40, will be described in detail. A head switching pulse (g) of 30 Hz is frequency-divided by a ½ frequency dividing circuit 41 to be a pulse signal of 15 Hz which is in turn applied to the monostable multivibrator 42. The MM 42 converts the pulse signal of 15 Hz into a motor control signal (d) with the pulse width Z and the frequency of 15 Hz. The pulse width Z is determined by the tape transporting speed and its accuracy. The motor control signal (d) is controlled by the output signal (f) from FF 12. The signal (d) is applied to the gate 7, by way of a gate 18 which is enabled or made conductive only when the output signal (f) is at high level. Thus, in the case of the pulse drive, the magnetic tape may be reliably and discretely transported. Therefore, this embodiment is well suited for this kind of the control.

The frame feeding operation follows. Under a condition that a good still picture is obtained through the just-mentioned operation, the frame feeding pulse generating means 41 is operated to produce frame feeding pulses for a short period (FIG. 12(a)). The frame feeding pulse (a) inhibits the gate 15 to release the motor brake 9 while at the same time it is applied through the gate circuit 7 to the motor drive circuit 5 to drive the capstan motor 6 during a period of the pulse width thereby to feed slightly the magnetic tape. The slight or minute movement of the magnetic tape disorders the phase-coincident between the signals (h) and (j) so that the signal (i) disappears. Upon the disappearance of the signal (i), the flip-flop 12 operates to feed the pulse (d) to the capstan motor 6. As a result, the operation of the magnetic record/playback system becomes an automatic feeding mode so that the tape feeding continues until the next best still picture is obtained and it automatically stops as in the previously case. This state is illustrated in FIG. 12. FIG. 12(b) shows the pulse (d) applied to the capstan motor 6. In place of directly driving the motor driving circuit 5 by the output signal from the frame feeding pulse generating means 41, the frame feeding pulse may drive the gate 18 during the pulse width period of the frame feeding pulse to permit the signal (d) to pass therethrough to the drive circuit.

If the output signal from the frame feeding pulse generating means 41 is continually generated with a fixed period, for example, of 10 seconds, the frame is fed at every internal of the fixed period (10 seconds) so that a kind of extremely slow reproduction image is obtained.

As described above, the embodiment may automatically obtain a good still picture, if necessary in a normal playback mode, and allows a frame feeding in the STILL playback mode.

What is claimed is:

1. In a magnetic record/playback system of the rotating head type, wherein a recording track having a plurality of fields or frames is scanned on a magnetic tape driven by a capstan motor, said system having a selectable normal play mode and a still play mode, said head operating in response to a head switching pulse generated by means in said system during a still play mode an apparatus for optimumally producing still pictures, comprising:
   means for switching the drive mode of said capstan motor to a low speed when said system is switched from a normal play mode to a still play mode;
   level detecting means for detecting an envelope signal from said rotating head, said detecting means producing a pulse having a period corresponding to the time said envelope signal magnitude is below the magnitude of a reference signal;
   gate means for providing a signal when said level detecting means pulse is time coincident with said switching pulse;
   braking means connected to stop said capstan motor in response to a signal from said gate means; and
   detected level control means connected to receive said pulse produced from said level detecting means, said control means providing an integrated voltage level from said produced pulse, said voltage level being applied as a reference signal to said level detecting means whereby said level control means provides a feedback signal for maintaining the width of pulses produced by said level detecting means substantially constant.

2. A magnetic record/playback system according to claim 1, wherein the output pulse from said level detecting means is also used as a drive pulse for a dropout compensating means, and said detected level control means is operated only in the still picture playback mode.

* * * * *